Figure 2:
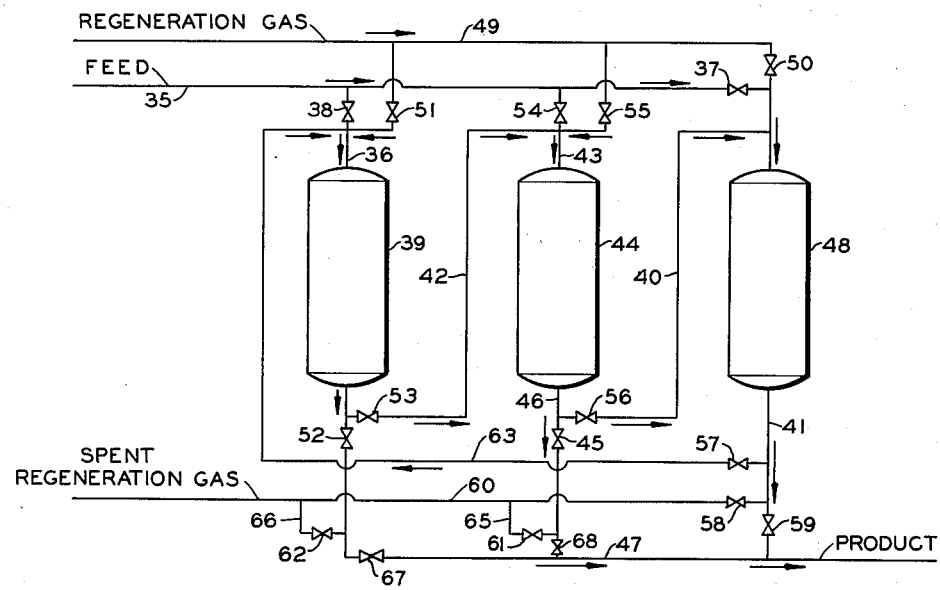

June 16, 1953 — J. P. HOGAN — 2,642,467
PRODUCTION OF HIGH OCTANE FUEL COMPONENTS
Filed May 11, 1950

INVENTOR.
J. P. HOGAN
BY
Hudson + Young
ATTORNEYS

Patented June 16, 1953

2,642,467

UNITED STATES PATENT OFFICE 2,642,467

PRODUCTION OF HIGH OCTANE FUEL COMPONENTS

John Paul Hogan, Bartlesville, Okla., assignor to Phillips Petroleum Company, a corporation of Delaware Application May 11, 1950, Serial No. 161,391

13 Claims. (Cl. 260—683.15)

This invention relates to an improved process for the production of high yields of 2,2,3-trimethylpentene (methyltriptene). In one of its more specific aspects it relates to an improved method for producing 2,2,3-trimethylpentene by controlled copolymerization of 2-butene and isobutene. In one specific embodiment my invention relates to the production of a high octane gasoline component polymer containing 2,2,3-trimethylpentene.

Numerous methods are disclosed in the art for the polymerization or copolymerization of olefins. Various catalysts have been disclosed such as sulfuric acid, phosphoric acid, silica-alumina, activated natural clays, and the like. In the processes disclosed attempts have been made to improve the yields or quality of the product. In most cases, however, either yield or quality has been sacrificed.

An object of this invention is to provide an improved process for the copolymerization of 2-butene with isobutene.

Another object is to provide an improved method for producing 2,2,3-trimethylpentene in continued high yields.

Another object is, in the process for producing 2,2,3-trimethylpentene by copolymerization of 2-butene and isobutene, to suppress the formation of undesirable difficultly separated 3,4-dimethylhexene.

Another object is to reduce the proportion of 2,2,4-trimethylpentene in relation to the proportion of 2,2,3-trimethylpentene produced by the copolymerization of 2-butene with isobutene.

Another object is to produce by the copolymerization of 2-butene with isobutene a $C_8$ product at all conditions of catalyst activity which when hydrogenated is of more uniform high octane rating.

Various other objects and advantages of my invention will be apparent to one skilled in the art from the following discussion and disclosure.

I have discovered an improvement in the method for the copolymerization of 2-butene and isobutene, disclosed in copending application Serial No. 169,848, filed June 23, 1950, which produces a maximum quantity of $C_8$ polymer that on hydrogenation is of uniform high octane rating. The silica-alumina catalyst used in my invention is that disclosed in copending application Serial No. 599,536, filed June 15, 1945, now Patent No. 2,606,940, or a modification of this catalyst containing cobalt oxide instead of nickel oxide as disclosed in copending application Serial No. 169,848, identified above. Preparation of the nickel oxide catalyst used is fully set out in Patent No. 2,606,940. According to the teaching of this patent, a preferred method of preparing the catalyst is to impregnate silica gel with an aqueous solution of an aluminum salt which is decomposable to alumina upon heating. Such salts are the sulfate and nitrate of aluminum. The thus prepared silica-alumina is then impregnated with an aqueous solution of nickel nitrate which is subsequently converted to the oxide by heating. This catalyst is then activated by heating in an oxygen containing atmosphere at a temperature within the range of 300 to 700° C. More complete details and modifications of the catalyst preparation are found in this patent under the headings "Preparation of Catalyst," "Percentage of Nickel Oxide," and "Use of Alumina as Promoter," and by referring to Examples 3 and 5. The cobalt oxide catalyst is prepared in the same manner.

I have found that during the polymerization cycle the proportion of 2,2,3-trimethylpentene in the polymer produced decreases with increased time on stream. Thus, I have found that, when reaction conditions are in all other respects maintained constant, as the catalyst ages the proportion of 2,2,3-trimethylpentene in the $C_8$ fraction decreases and the proportion of 2,2,4-trimethylpentene increases. Since the 2,2,3-trimethylpentene on hydrogenation is of better octane number and has a better rich mixture performance than the 2,2,4-isomer, it is desirable to maintain the proportion of the former at a maximum and the latter at a minimum.

In accordance with my invention, the proportion of 2,2,3-trimethylpentene produced by the copolymerization of 2-butene with isobutene in the presence of a silica-alumina catalyst promoted with a material such as nickel or cobalt oxide can be maintained at a uniform high level and the proportion of 2,2,4-trimethylpentene maintained at a low level by controlling the ratio of 2-butene to isobutene in the hydrocarbon feed in accordance with the age of the catalyst. Thus, with new catalyst or with freshly regenerated catalyst, optimum production of 2,2,3-trimethylpentene and minimum production of 2,2,4-trimethylpentene can be obtained with a feed containing a relatively lower ratio of 2-butene to isobutene, while later on in the cycle similar proportions of 2,2,3-trimethylpentene and 2,2,4-trimethylpentene are produced only with an increased ratio of 2-butene to isobutene. More specifically, I have found that in the production of copolymer from the reaction of 2-butene with isobutene it is desirable to change the ratio of 2-butene to isobutene from the range of 5:1 to 14:1 when the catalyst is fresh to the range of 18:1 to 25:1 when the catalyst has been on-stream, say, for approximately 3 to 6 hours, so as to maintain the yield of 2,2,3-trimethylpentene at a uniform high level.

Desirable operating conditions other than the ratio of 2-butene to isobutene are a temperature in the range of 30 to 200° F., a liquid hourly space velocity of 1 to 20, and a pressure of 1 to 50 atmospheres. Usually, preferred conditions of operation are the following: temperature 75 to 120° F., liquid hourly space velocity 5 to 15, and pressure 5 to 20 atmospheres. Operating in these ranges the yield of 2,2,3-trimethylpentene in the polymer product is high and the 2,2,4-isomer and 3,4-dimethylhexene are low, thus maintaining the octane number of the hydrogenated product high.

A more clear understanding of some of the many aspects of my invention may be had by referring to the attached drawings, which are schematic flow diagrams of three modifications of my process. Various additional valves, pumps, and other conventional equipment necessary for the practice of this invention will be familiar to one skilled in the art, and have been omitted for the sake of clarity. The descriptions of the drawings provide three methods of operating my process. However, while they are representative in general of my process, various minor changes may be made in adapting them to the various conditions within the scope of the invention.

Figure 1:
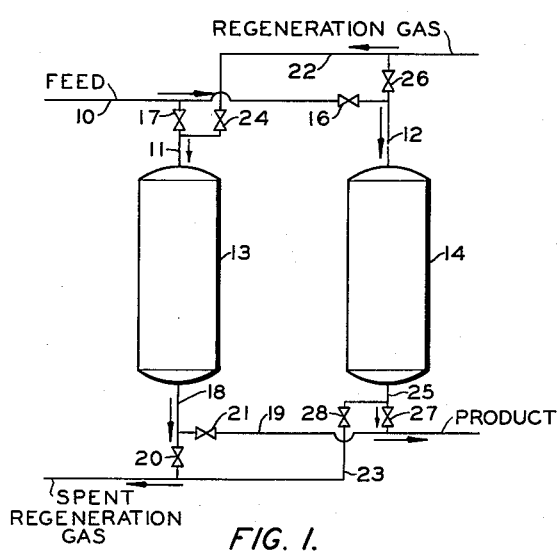

Refer now to Figure 1, which is a flow diagram of a continuous process. The mode of operation characterized by this drawing utilizes a stationary catalyst bed with alternate on-stream and regeneration periods. From an economical standpoint it is desirable to utilize two catalyst chambers as indicated. However, intermittent operation may be carried out with only one catalyst chamber. Two-butene and isobutene in admixture in previously disclosed ratios are fed through line 10 to lines 11 and 12 through which it is passed to reaction chambers 13 and 14 respectively. In the first step of the operation valve 16 in line 10 will remain closed, and valve 17 in line 11 will remain open, thereby causing the feed to pass only to chamber 13. Effluent from chamber 13 is removed via line 18 and is passed therefrom through line 19 to a suitable separation zone wherein the polymer is recovered and from which it is passed to a hydrogenation zone. When operating in this manner valve 20 remains closed and valve 21 remains open.

If chamber 14 has been previously used, regeneration gas is passed through line 22 to line 12 and therefrom through the catalyst chamber, regenerating the spent catalyst therein. Spent regeneration gas is withdrawn from chamber 14 through line 25 and is passed therefrom through line 23 to suitable exhaust. When so operating, valves 24 and 27 remain closed, and valves 26 and 28 remain open.

When chamber 13 becomes impractical to operate because of lost catalyst activity, valve 17 in line 11 is closed, as is valve 21 in line 19, and valve 24 in line 22 and valve 20 in line 18 are opened. At the same time, chamber 14 will be put on-stream by opening valve 16 and allowing feed to pass through lines 10 and 12 into the reaction chamber and by opening valve 27 in line 25. Product from chamber 14 will be withdrawn through line 25 to line 19 and passed to further treatment, such as fractionation and hydrogenation. When product is being recovered through line 25, valve 28 in line 23 will be closed.

Refer now to Figure 2, which is similar to Figure 1 in that the catalyst is maintained in stationary beds which are regenerated alternately. A feed stream containing 2-butene and isobutene in the proper proportions for fresh catalyst is passed through line 35 to line 36 with valve 37 in line 35 being closed, and valve 38 in line 36 open. The feed enters chamber 39 and is copolymerized at conditions previously described for fresh catalyst. It has been found that during the first part of the cycle, when the catalyst is relatively fresh, about equal quantities of 2-butene and isobutene are used up. Therefore, effluent from the catalyst chamber when the catalyst is fresh will contain 2-butene in a ratio greater than that of the fresh feed introduced to the chamber. In view of this, applicant has found it quite desirable to pass the effluent from a catalyst which is being used for the first cycle through a chamber which has been partially spent. To utilize the catalyst to the utmost, applicant therefore passes an effluent from a first catalyst reaction in which the 2-butene is in a higher ratio than in the original feed to a catalyst of considerably less activity than that with which the feed was originally contacted. To carry this out, the effluent from zone 39 of Figure 2 is withdrawn via line 47 and is passed through lines 42 and 43 to chamber 44, previously used for polymerization. The effluent from this chamber is then withdrawn through line 46 and is passed therefrom through line 47 to suitable separation means and on to hydrogenation. In the meantime, chamber 48, which has previously been used in both steps of the reaction, is regenerated by contacting it with a suitable gas, such as hot oxygen containing gas, introduced thereto via line 49, and withdrawn via line 41 and exhausted via line 60. In the first cycle of operation, valves 38, 45, 50, 53, 58, and 68 remain open, while valves 51, 52, 54, 55, 6, 37, 57, 59, 61, 67, and 62 are closed. The cycle is then carried out using chamber 48 as the first reaction chamber and chamber 39 as the second reaction chamber with the effluent from chamber 48 being transmitted to chamber 39 through line 63. At the same time, chamber 44 will be on regeneration and the regeneration gas exhausted therefrom via lines 46, 65, and 60. Similarly, the third cycle will be chamber 44 as a first chamber and chamber 48 as the second chamber with chamber 39 on regeneration. The effluent from zone 44 is passed to zone 48 via line 40. The regeneration gas is exhausted from zone 39 via lines 47, 66, and 60.

Figure 3:
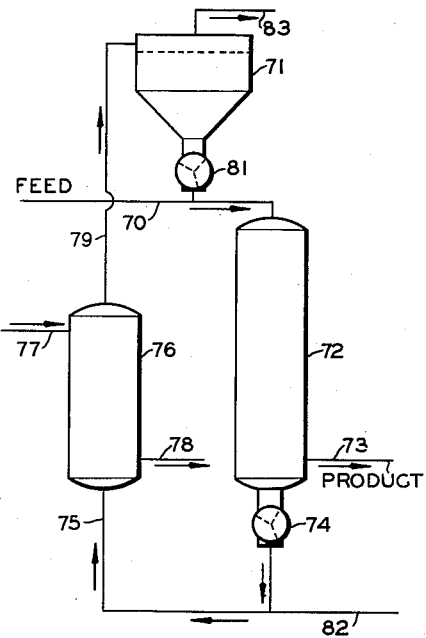

A third modification of my invention utilizes a moving catalyst bed of the conventional type. In Figure 3 the feed gas containing 2-butene and isobutene is passed through line 70 with fresh catalyst from hopper 71 to chamber 72. The catalyst moves downwardly through this chamber and as it passes downwardly becomes more spent. The fresh feed entering at the same or near the same point as the fresh catalyst contacts the fresh catalyst first utilizing more of the isobutene, and thereby changing the ratio so that the proportion of 2-butene is increased. As this gas passes downwardly through the catalyst, it contacts the more spent material, but since the gas ratio is changed in the optimum direction, product containing approximately the same quantity of 2,2,3-trimethylpentene and the 2,2,4-isomer will be continually produced. Product from the polymerization reaction is removed via line 73 and is passed to suitable separation means and from there to hydrogenation. Spent catalyst is removed from the bottom of chamber 72 as by star valve 74 or other suitable controlling means, and is carried by any suitable means, such as a gas or mechanical lift, to regeneration zone 76. In this zone a suitable gas contacts the catalyst, regenerating same. Typifying this operation, the catalyst is transmitted through conduit 75 to zone 76, where it countercurrently contacts regeneration gas introduced through line 77 and withdrawn through line 78. From this zone freshly regenerated catalyst is carried through line 79 back to hopper 71, from which it is fed in a suitable manner, as by star valve 81, into the feed gas in line 70. In one method of operation which may be utilized, a mechanical conveyor may transmit the spent catalyst to the regeneration zone, and therefrom to the storage hopper. In an alternative mode of operation, a suitable carrier gas, such as air or other gas inert to the catalyst, may be used to blow the catalyst from the bottom of chamber 72 to the regeneration zone, and therefrom to the catalyst hopper. In this mode of operation the gas is introduced to the spent catalyst through line 82. When using a gas in the manner described, separation means must be provided, allowing the catalyst to drop out from the carrier gas. This may merely be the expanded area of the upper portion of the storage chamber, or it may be a cyclone separator or the like. When the upper portion of the catalyst hopper is used for this purpose a vent for the carrier gas, such as vent 83, should be provided.

The hydrogenation of the copolymer is strictly a conventional procedure, and may use any suitable hydrogenation catalyst and reaction conditions which will provide non-destructive hydrogenating. Catalyst such as nickel oxide-on-kieselguhr, oxides or sulfides of 6th group metals, such as molybdenum and tungsten, either supported or unsupported, etc. are satisfactory. One particularly advantageous catalyst which may be used is disclosed in U. S. Patent 2,377,411 to Frey, issued June 5, 1945. Suitable pressures for hydrogenation are in the range of 50 to 3,000 p. s. i., while temperatures are generally in the range of say 100 to 750° F. Contact times and temperatures and pressures will vary generally within the ranges disclosed and selection of suitable conditions of operation from these ranges is well within the skill of the art. In most cases it is desirable to use a high circulation of hydrogen, generally above the quantity required to saturate the polymer. The quantities of hydrogen used may also be readily selected by one skilled in the art.

The following specific example is submitted herewith to show the advantage of my process as applied to the copolymerization of 2-butene with isobutene. The reactants and their proportions and other specific ingredients are presented as being typical and should not be construed to limit the invention unduly.

*Example*

The following data were obtained in a series of runs in which a 2-butene-isobutene mixture was passed over a silica-alumina catalyst promoted with approximately five weight per cent of nickel oxide. The hydrocarbon feed was maintained in liquid phase in the reaction chamber, and was charged at a rate of 10 liquid volumes per volume of catalyst per hour. The reaction temperature was maintained at 85° F. Following the polymerization step, the polymer was separated and hydrogenated, the analysis shown being that of the hydrogenated product in volume per cent.

| 2-Butene/ Isobutene Ratio | Hours on Stream | 2,2,4-TMP | 2,2,3-TMP | 2,3,4- and 2,3,3-TMP | 3,4-DMH | $C_{12}+$ |
|---|---|---|---|---|---|---|
| 10/1 | 0-4 | 20.5 | 43.0 | 11.5 | 8.5 | 16.5 |
| 10/1 | 4-8 | 35.5 | 37.0 | 10.0 | 4.5 | 13.0 |
| 20/1 | 0-4 | 12.5 | 47.5 | 12.0 | 17.0 | 11.0 |
| 20/1 | 4-8 | 21.5 | 45.5 | 13.5 | 9.0 | 10.5 |

The data in the above table demonstrate that the advantages of the present invention cannot be obtained by operating at a constant mol ratio of 2-butene to isobutene. When the fresh catalyst was put on-stream at a 2-butene to isobutene ratio of 10:1 the initial production of 2,2,3-trimethylpentene is high. After 8 hours at this ratio, however, the yield of 2,2,3-trimethylpentene had decreased with an increase in the yield of 2,2,4-trimethylpentene, a less desired material. In the second run the ratio of 2-butene to isobutene was maintained at 20:1 and the yield of 2,2,3-trimethylpentene from this run was desirably high. However, the yield of 3,4-dimethylhexene at this ratio was twice as high as at the 10:1 ratio. Since 3,4-dimethylhexene, when hydrogenated to the hexane, has an ASTM octane rating of only 84, it is desirable to maintain the volume of this material as low as possible. After 4 to 8 hours on-stream at a 20:1 ratio the yield of 3,4-dimethylhexene had decreased to almost the same value produced at a 10:1 ratio with fresh catalyst; the yield of 2,2,3-trimethylpentene was still high; and the yield of 2,2,4-trimethylpentene was of the same order of magnitude as the yield at a 10:1 ratio with fresh catalyst. Thus, it is clear that operation at a constant 20:1 ratio will not produce the results taught by the present invention either. If, however, operation using fresh catalyst is begun at a 2-butene to isobutene ratio of about 8:1 to 14:1 and increased to about 18:1 to 25:1, by the time the catalyst has been on-stream 3 to 6 hours a high yield of 2,2,3-trimethylpentene is maintained, the yields of 3,4-dimethylhexene and 2,2,4-trimethylpentene are not inordinately high, and the product on hydrogenation is of uniform high octane rating.

In the practice of my invention the actual on-stream time for the catalyst will depend on whether the olefin feed contains impurities that deposit as carbonaceous matter or as sulfur compounds on the catalyst. A high purity feed obviously allows longer on-stream periods.

Although this process has been described and exemplified in terms of its preferred modifications, it is understood that various changes may be made without departing from the spirit and scope of the disclosure and of the claims.

I claim:

1. A process for the production of hydrocarbons hydrogenatable to high octane rating fuel components which comprises polymerizing 2-butene with isobutene in a mol ratio in the range of 5:1 to 14:1 in contact with a silica-alumina catalyst promoted with an oxide of the group nickel oxide and cobalt oxide, continuing the polymerization until the activity of the catalyst and yield of polymer have appreciably decreased, thereafter increasing the mol ratio of 2-butene to isobutene to the range of 18:1 to 25:1 and continuing the reaction until catalyst deactivation renders further contacting uneconomical, and recovering polymer desirable for hydrogenation.

2. The process of claim 1 utilizing nickel oxide as a promoter.

3. The process of claim 1 utilizing cobalt oxide as a promoter.

4. A process for the production of a polymer having on hydrogenation a high octane number and high rich mixture performance as an engine fuel constituent containing a minimum of low octane materials which comprises copolymerizing a mixture of 2-butene and isobutene in the presence of a nickel oxide promoted silica-alumina catalyst, initiating said copolymerization with said 2-butene and said isobutene being in a mol ratio to each other in the range of 5:1 to 14:1, continuing said copolymerization for a period of 3 to 6 hours, thereafter increasing the ratio of 2-butene to isobutene to within the range of 18:1 to 25:1, and continuing the polymerization at the higher ratio until further substantial deactivation of the catalyst is effected, and separating and recovering the $C_8$ polymer from the effluent of said copolymerization.

5. A process according to claim 4 wherein said copolymerization is carried out in liquid phase.

6. A process for the production of maximum quantities of 2,2,3-trimethylpentene in the resultant polymer product from the copolymerization of 2-butene with isobutene and a reduction in quantity of materials which when hydrogenated have a lower octane rating and rich mixture performance than hydrogenated 2,2,3-trimethylpentene, which comprises contacting in liquid phase a mixture of 2-butene and isobutene in a mol ratio in the range of 8:1 to 14:1 with a nickel oxide promoted silica-alumina catalyst at a temperature in the range of 30 to 200° F., a pressure in the range of 1 to 50 atmospheres, and a liquid hourly space velocity in the range of 1 to 20, continuing the contacting at the same conditions of reaction for a period in the range of 3 to 6 hours at which time the ratio of 2-butene to isobutene is increased to within the range of 18:1 to 25:1, continuing the reaction until uneconomical because of catalyst deactivation, and recovering a $C_8$ polymer fraction from the effluent of said reaction which on hydrogenation has exceptionally high octane number and rich mixture performance.

7. A process for the production of a $C_8$ hydrocarbon polymer containing a maximum of 2,2,3-trimethylpentene and a minimum of 2,2,4-trimethylpentene and 3,4-dimethylhexene which comprises contacting a mixture of 2-butene and isobutene in a mol ratio in the range of 8:1 to 14:1 and in liquid phase with a silica-alumina catalyst promoted with 0.05 to 10 weight per cent nickel oxide, carrying out the contacting at a temperature in the range of 75 to 120° F., a pressure in the range of 5 to 20 atmospheres, and a liquid hourly space velocity in the range of 5 to 15, continuing the contacting at the same conditions of reaction for a period in the range of 3 to 6 hours at which time the ratio of 2-butene to isobutene is increased to within the range of 18:1 to 25:1, and recovering a $C_8$ hydrocarbon polymer from the effluent of the reaction.

8. A process according to claim 7 wherein the catalyst is promoted with 5 per cent of nickel oxide, the first ratio of 2-butene to isobutene is 10:1, and the second ratio of 2-butene to isobutene is changed after 4 hours to 20:1.

9. A continuous process for the production of $C_8$ hydrocarbon polymer of high octane rating and high rich mixture performance which comprises introducing a mixture of 2-butene and isobutene in a ratio in the range of 5:1 to 14:1 to a first reaction zone containing a silica-alumina catalyst promoted with nickel oxide, reacting the components of said mixture for a period of time in the range of 3 to 6 hours, thereafter increasing the ratio of 2-butene to isobutene to within the range of 18:1 to 25:1 and continuing the reaction at the increased ratio until uneconomical because of catalyst deactivation, at this point shifting the feed to a reaction zone containing fresh catalyst and changing the ratio of 2-butene to isobutene in the feed to 5:1 to 14:1, continuing the reaction in the second reaction zone as described in regard to the first reaction zone while concomitantly regenerating the catalyst in the first reaction zone, and continuously alternating from one reaction zone to the other as the catalyst becomes deactivated; recovering from the effluent of said reaction zones when on-stream a $C_8$ hydrocarbon polymer fraction, hydrogenating said $C_8$ polymer fraction, and recovering from said hydrogenation a $C_8$ gasoline component fraction of high octane rating and rich mixture performance.

10. A process according to claim 9 wherein the first ratio of 2-butene to isobutene is 10:1 and the second ratio is 20:1.

11. A continuous process for the production of $C_8$ hydrocarbon polymer of exceptionally high octane rating and rich mixture performance which comprises contacting a mixture of 2-butene and isobutene in a ratio of 5:1 to 14:1 with a silica-alumina catalyst promoted with 0.01 to 10 weight per cent nickel oxide calculated as nickel for a period of 3 to 6 hours in a first catalyst zone, passing the effluent from this zone in which the ratio of 2-butene to isobutene has been increased by the polymerization reaction to a second catalyst zone previously used for a period of 3 to 6 hours to polymerize 2-butene and isobutene in a ratio of 5:1 to 14:1, and continuing the polymerization until the catalyst has become deactivated, concomitantly regenerating the catalyst in a third zone which has been used previously for both production steps of the cycle, shifting the fresh feed from the first catalyst zone to the regenerated third catalyst zone and passing the effluent from this zone through the first catalyst zone, concomitantly regenerating the second catalyst zone, after 3 to 6 hours shifting the fresh feed from the third catalyst zone to the second catalyst zone and passing the effluent from this zone to the third catalyst zone while concomitantly regenerating the first catalyst zone, and continuously carrying out the cycle described while recovering a $C_8$ hydrocarbon polymer from the polymerization effluent and passing the $C_8$ polymer to a hydrogenation zone wherein it is converted into high octane rating and rich mixture performance motor fuel constituents.

12. A process according to claim 11 wherein the polymerization reaction conditions are a temperature in the range of 30 to 200° F., a pressure in the range of 1 to 50 atmospheres, and a liquid hourly space velocity in the range of 1 to 20.

13. A continuous process for the production of $C_8$ hydrocarbon polymer of exceptionally high octane rating and rich mixture performance which comprises passing a mixture of 2-butene and isobutene in a ratio of 5:1 to 14:1 in concurrent contact under polymerizing conditions with a continuously downwardly moving bed of freshly regenerated silica-alumina catalyst promoted with nickel oxide at a temperature in the range of 30 to 200° F., a pressure in the range of 1 to 50 atmospheres, and a liquid hourly space velocity in the range of 1 to 20, so that as the polymerization proceeds the ratio of 2-butene to isobutene progressively increases and the reactants are progressively contacted with less active catalyst thereby maintaining a substantially uniform yield of $C_8$ polymer, withdrawing spent catalyst from the bottom of said moving bed of catalyst and passing same to regeneration, regenerating said spent catalyst and returning same to the top of said moving bed, removing effluent from said contacting near the bottom of said moving bed of catalyst and recovering therefrom a $C_8$ polymer fraction, hydrogenating said $C_8$ polymer and recovering from said hydrogenation motor fuel components of high octane rating and rich mixture performance.

JOHN PAUL HOGAN.

References Cited in the file of this patent

UNITED STATES PATENTS

| Number | Name | Date |
| --- | --- | --- |
| 2,368,110 | Buell | Jan. 30, 1945 |
| 2,377,411 | Frey | June 5, 1945 |
| 2,470,171 | Kennedy et al. | May 17, 1949 |